Dec. 12, 1972    P. L. BOURGAULT ET AL    3,706,013
ION EXCHANGE MEMBRANE ELECTROCHEMICAL INTEGRATOR
Original Filed May 23, 1968
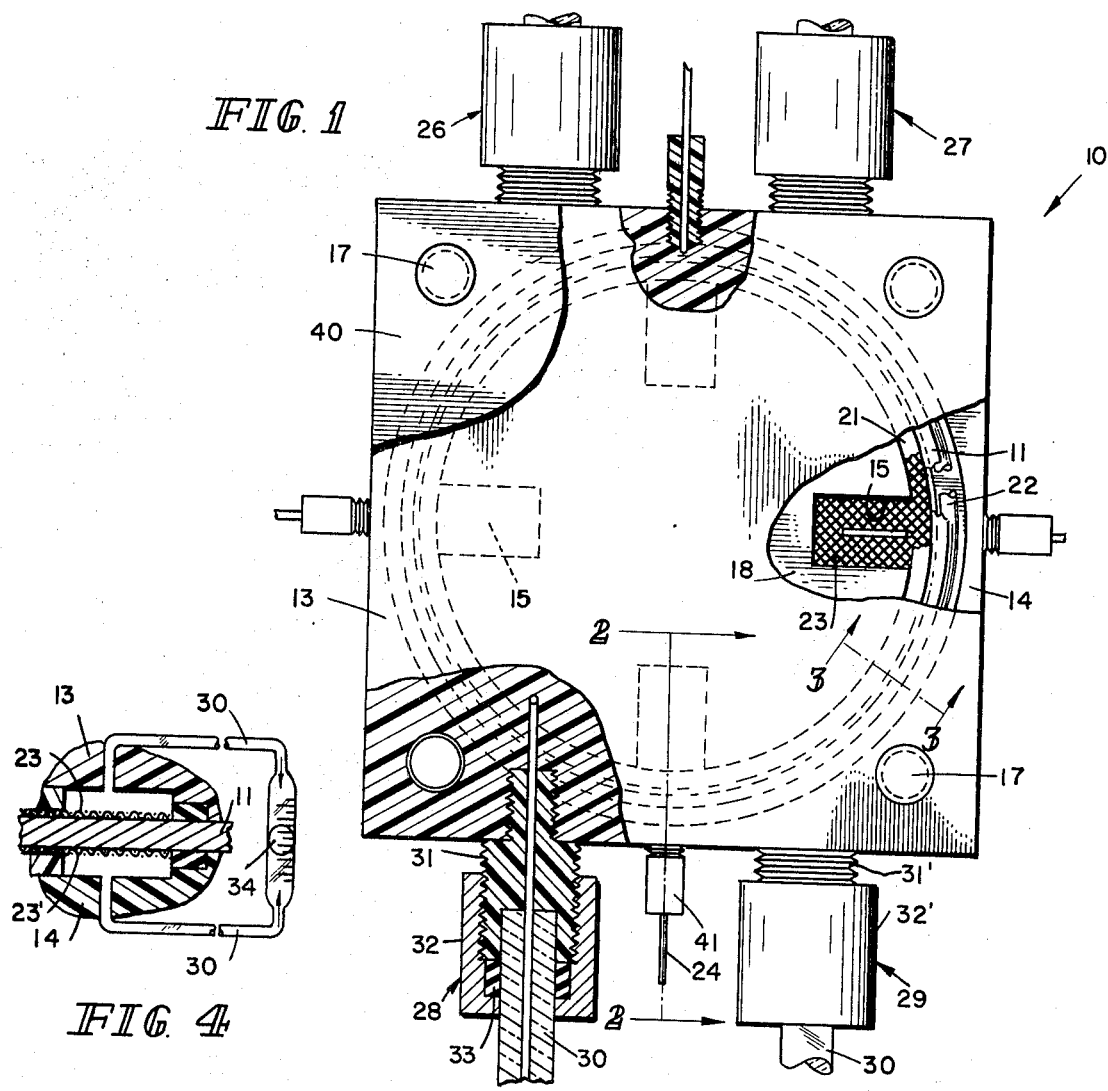
FIG. 1
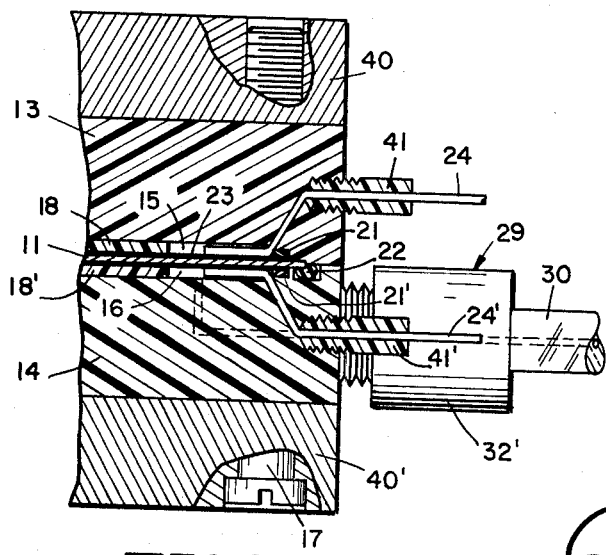
FIG. 2
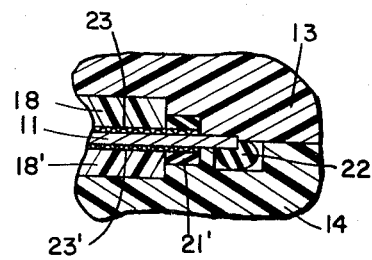
FIG. 3
FIG. 4
INVENTORS
PIERRE L. BOURGAULT
GEORGE H. FRASER
BY
Charles W. Hoffmann
ATTORNEY United States Patent Office 3,706,013
Patented Dec. 12, 1972

3,706,013
ION EXCHANGE MEMBRANE ELECTRO-CHEMICAL INTEGRATOR
Pierre Louis Bourgault, Don Mills, Ontario, and George Herbert Fraser, Weston, Ontario, Canada, assignors to Johnson Matthey & Mallory Limited, Toronto, Ontario, Canada
Continuation of abandoned application Ser. No. 731,556, May 23, 1968. This application Dec. 24, 1970, Ser. No. 101,409
Int. Cl. H01g 9/00
U.S. Cl. 317—231                                    11 Claims

ABSTRACT OF THE DISCLOSURE

An electrochemical integrator including a work area divided into work compartments by an ion exchange membrane means, electrode means cooperatively associated with the work compartments, an ionizable material such as a gas, reagent or product, which ionizes due to the passage of current through the electrode means in the work compartments, and a measuring means which displays the quantity of gas, reagent or product transferred through the ion exchange membrane means. The quantity of ionizable material transferred between the work compartments is proportional to the electrical charge passed through the electrode means.

---

This application is a continuation of Ser. No. 731,556, filed May 23, 1968, now abandoned.

The present invention relates to an electrochemical current-time integrator and, more particularly, to an electrochemical current-time integrator of the type using an ion-permeable membrane and, more particularly, an ion exchange membrane.

In the operation of the present invention, the passage of current through electrode means positioned on opposite sides of an ion-permeable membrane causes a material such as a gas on one side of the ion-permeable membrane to ionize and migrate through the ion-permeable membrane. The number of ions so transferred is proportional to the amount of current flowing through the electrode means. By way of illustration, if a gas such as hydrogen is used, ions are produced by the ionization of the gas at one of the electrode means through which current is flowing; the ions are transferred through the ion-permeable membrane; and the ions, upon contacting an electrode means through which current is flowing on the opposite side of the ion-permeable membrane, are discharged to the gas. The quantity of material involved in the reactions occurring at the electrode means is determined by the quantity of ions migrating through the said ion exchange membrane from one side of the membrane to the other side of the membrane. Therefore, one or both of the quantities of the gas on either side of the membrane may be used to indicate the charge passed through the electrode means.

When connected to a source of constant direct current, the integrating device of the present invention displays the time during which the current was permitted to flow, thus serving as a chronometer.

Therefore, it is an object of the present invention to provide an electrochemical current-time integrator which utilizes a membrane, such as an ion exchange membrane, permeable to ions of a selected material but not permitting the flow of the non-ionized material therethrough.

Another object of the present invention is to provide a means and method for determining the amount of electricity in coulombs passing through a conductor.

Yet another object of the present invention is to provide an electrochemical current-time integrator for accurately measuring and indicating the elapsed time constant direct current means has functioned.

A further object of the present invention is to provide an electrochemical current-time integrator that is sturdy, inexpensive to manufacture and reliable in operation.

Another object of the present invention is to provide an electrochemical current-time integrator which has high current carrying capability and low internal resistance.

Yet another object of the present invention is to provide an electrochemical current-time integrator wherein hydrogen gas in a first work chamber is oxidized to form hydrogen ions, the ions are transferred through the ion-permeable membrane whereupon the hydrogen ions are reduced to hydrogen gas in a second work chamber so that the respective increase and decrease of the volume of hydrogen gas in the work chambers is indicative of the quantity of electricity in coulombs passed through the integrator.

The present invention, in another of its aspects, relates to the novel features of the instrumentalities of the invention described herein for teaching the principal objects of the invention and to the novel principles employed in the instrumentalities whether or not these features and principles may be used in the said objects and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate an embodiment of the present invention constructed to function in the most advantageous modes devised for the practical application of the basic principles employed in the hereinafter described invention.

In the drawings:

FIG. 1 is an enlarged fragmentary sectional view of the electrochemical current-time integrator;

FIG. 2 is an enlarged fragmentary sectional view of the electrochemical current-time integrator taken across the lines 2—2 of FIG. 1;

FIG. 3 is an enlarged fragmentary sectional view of the electrochemical current-time integrator taken across the lines 3—3 of FIG. 1; and FIG. 4 is a fragmentary diagrammatic showing of the hydrogen-containing work compartments separated by an ion exchange membrane and coupled to each other through a capillary tube containing a droplet of mercury.

Generally speaking, the present invention includes a housing, a work area formed in the housing, an ion-permeable membrane permeable to a selected species of ions positioned across the work area thereby dividing it into separate work compartments, electrode means, and means coupled between the work compartments for measuring the quantity of material transferred from one work compartment to the other work compartment through the ion-permeable membrane. The electrode means are positioned on opposite sides of the ion-permeable membrane. A particular material such as a gas is introduced into each of the work compartments through inlet valve means. The electronic current flowing through the electrode means ionizes the material introduced into the work compartment in which the electrode means is positioned. The ions so produced are transferred through the membrane, which acts as an electrolyte, and are reconverted to the initial material by the current flowing through the other electrode means. The quantity of material reacting is determined by the current and time in accordance with Faraday's well-known laws of electrolysis, and is displayed by measuring means coupled between the work compartments indicating the difference in the amount of material contained by the two compartments.

It was found that hydrogen gas and oxygen gas are satisfactory ionizable materials. The materials are ionized during the passage of current through the electrode means of the integrator means. Of the ionizable materials hydrogen and oxygen, hydrogen is most preferred because of the relatively simple chemical reactions involved during ionization and reconversion reactions. However, it is thought that materials other than hydrogen and oxygen may be used.

In the present invention, the material reacts with an electrode means when current flows therethrough and the ion exchange membrane serves as the electrolyte. In several of the prior art devices a liquid metal such as mercury acts as an electrode. In other prior art devices, the reacting species is a component of the electrolyte. In the present invention, the ionizable material is neither an electrode nor a component of the electrolyte. Therefore, the several prior art devices may be considered to be two-phase devices, that is, consisting of electrodes and electrolyte; whereas the present invention may be considered to be a three-phase device, that is, consisting of the ionizable material, electrode means and electrolyte. Several of the prior art devices use an electrolyte-permeable diaphragm which permits the passage of an electrolyte therethrough whereas in the present invention, the ion exchange membrane is the electrolyte.

Referring now to the view illustrated in FIG. 1 of the drawing, the electrochemical current-time integrator is indicated by the reference numeral 10. The device is constructed from two housing halves or blocks 13 and 14, fabricated from a material which is impervious to fluids such as gases and the like. An example of a suitable material is polytetrafluoroethylene or the like. A portion of each of the contacting surfaces of the two housing halves have been removed to form adjacent work compartments 15 and 16 of the integrator. The work compartment 15 is formed in housing half 13. The work compartment 16 is formed in housing half 14. An ion exchange membrane 11, with the electrode means 23 and 23' on opposite sides thereof is retained tightly between the housing halves 13 and 14 by any suitable means such as rings 21 and 21' fabricated from any suitable material such as silicon rubber or the like. A suitable ion exchange membrane is a solid-polymeric ion exchange membrane. A precision O-ring 22, fabricated from any suitable material such as silicon rubber or the like, is inserted between the blocks to ensure that the two work compartments are substantially gas-tight. The housing halves 13 and 14 are fixedly retained between plates 40 and 40' by a plurality of coupling means 17 such as bolts, screws or the like. The plates 40 and 40' are fabricated from a suitable material such as brass or the like.

The electrode means 23 and 23' may be fabricated from any suitable electrically conductive material such as, for example, the noble metals. Of the noble metals, platinum is preferred. Each of the electrode means are wire screen electrodes as shown in FIG. 2. Wire screen electrodes are utilized because of the relatively large and advantageously distributed surface area and relatively large openings associated therewith thereby allowing a large contact area per volume of platinum wire employed. Electrically conductive wires or leads 24 and 24' fabricated from any suitable metal such as platinum are connected respectively to the electrodes 23 and 23' at a plurality of equally spaced locations as shown in FIG. 2. The leads 24 and 24' are retained in and insulated by retaining and insulating means 41 and 41' respectively, which are fabricated from any suitable material such as polytetrafluoroethylene or the like. The leads 24 and 24' are sealed into the means 41 and 41' respectively by any suitable insulating, chemically inert, gas-impermeable glue or resin.

The electrode means 23 may be electrically connected by lead 24 to the positive side of a direct current source (not shown) and, therefore, is the anode of the system. Electrode 23' may be electrically connected by the lead 24' to the negative side of the direct current source and, therefore, is the cathode of the system. As disclosed hereinbefore, the ion exchange membrane 11, separating the two electrodes, acts as the electrolyte in the electrochemical cell formed by the membrane 11 and the electrodes 23 and 23'.

The electrodes 23 and 23' are pressed into the membrane 11 to ensure good electrical contact between the respective electrodes and the membrane. It may be advantageous to employ an inert, porous material (porous enough to be permeable to the material used, such as gas), such as the pieces of polytetrafluoroethylene felt or mat 18 and 18' in the compartments 15 and 16 respectively which, respectively, hold the electrodes 23 and 23' tightly against the membrane 11. Each of the felt means is substantially circular when viewed towards its major surface.

Inlet means such as vents 26 and 27 are provided for directing the introduction of a suitable material such as hydrogen gas or the like into the respective work chambers. Each of the inlet vent means 26 and 27 include stop valve means (not shown) which permits or terminates the flow of an ionizable material such as hydrogen gas into the cooperatively associated work chamber or work compartment in accordance with the operator's needs. The valves are "shut off" so as to prevent further introduction of the ionizable material into the work compartments when current is passing through the cell. It is noted that vent 26 serves as a conduit for directing the flow of the ionizable material such as hydrogen gas from a source of gas (not shown) to work compartment 15. Vent 27 serves a similar function for the flow of hydrogen gas from a source of gas (not shown) to work compartment 16.

Outlet vents 28 and 29 each retain an extremity of a capillary tube 30 by means of support means 31 and 31' fabricated from any suitable material such as polytetrafluoroethylene and by ring nuts 32 and 32' fabricated from any suitable metal such as stainless steel or the like. The connections are made substantially gas tight by a silicon rubber gasket as shown at 33 of FIG. 1. The capillary tube 30 has one extremity coupled to work compartment 15 through pressure outlet vent 28 by means of a suitable passageway and the remaining extremity of the capillary tube is coupled to work compartment 16 through pressure outlet vent 29 by means of a suitable passageway. The passageway of the capillary tube includes a droplet of a suitable liquid 34 such as mercury. The position of the mercury in the capillary tube is indicative of the amount of reacting ionizable material transferred between the work compartments coupled by the capillary tube. Graduated lines may be printed on the capillary tube so that the difference in the amount of the said material contained by the two work compartments may be directly read therefrom.

Having thus described the structure of the present invention, the cooperation between the described structural elements will be disclosed.

For purposes of more clearly illustrating the inventive concepts involved in the present invention, the membrane 11 is assumed to be permeable to hydrogen ions and nonpermeable to hydrogen gas. It should be remembered that materials other than hydrogen gas may be used in place of hydrogen.

Hydrogen gas is introduced into work compartment 15 through gas inlet vent means 26 and into work compartment 16 through gas inlet vent means 27. When the compartments are substantially completely occupied by hydrogen at the desired pressure, current is passed through the electrodes 23 and 23′, causing hydrogen to be oxidized to hydrogen ions at the anode. For purposes of illustration, it is assumed that electrode 23 is the positive electrode. The hydrogen ions are transferred through the ion exchange membrane 11 to the cathode, which is assumed to be electrode 23′. At electrode 23′, the ions are reduced to hydrogen gas. Thus the reaction is transporting hydrogen as hydrogen ion across the ion exchange membrane 11 from compartment 15 to compartment 16. As hydrogen is transferred from anode compartment 15 to cathode compartment 16, the pressure of gas in the latter compartment exceeds that in the former compartment. As a result, the bead of mercury 34 moves along the capillary tube 30 towards the anode compartment 15 a distance necessary to equalize the pressure in the compartment 15 and 16. The distance the bead 34 is displaced depends on the amount of hydrogen as hydrogen ions which have been transferred across the membrane 11 which, in turn, depends on the charge, i.e., the integral of current with respect to time, passed between the electrodes 23 and 23′ according to Faraday's laws of electrolysis. The reactions at the electrodes are described by the following equations:

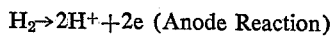

$H_2 \rightarrow 2H^+ + 2e$ (Anode Reaction)

$2H^+ + 2e \rightarrow H_2$ (Cathode Reaction)

If the oxygen is employed in lieu of hydrogen, the oxygen in contact with the negative electrode 23′, the cathode, is reduced to hydroxyl ions, which pass through the ion exchange membrane 11 to the positive electrode 23, the anode, where the ions are oxidized to oxygen. The reactions at the electrodes are described by the following equations:

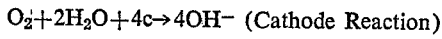

$O_2 + 2H_2O + 4e \rightarrow 4OH^-$ (Cathode Reaction)

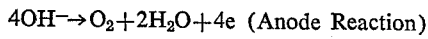

$4OH^- \rightarrow O_2 + 2H_2O + 4e$ (Anode Reaction)

When the reacting gas is hydrogen, the reactions involve cations. Therefore a cationic ion exchange membrane is used. When the reacting gas is oxygen, the reactions involve anions. Therefore, an anionic ion exchange membrane is used.

In another embodiment of the present invention, two membranes, separated by a highly conducting liquid electrolyte, may be substituted for the single membrane hereinbefore described. This procedure lowers the internal resistance of the integrating device.

While the invention is illustrated and described in an embodiment, it will be understood that modifications and variations may be effected without departing from the scope of the novel concepts of this invention and as set forth in the appended claims.

Having thus described our invention, we claim:

1. An electrochemical integrating means comprising a work area, ion-permeable means positioned across said work area dividing said work area into two work compartments, said ion-permeable means comprising a solid polymeric ion exchange material having sufficiently large openings to permit ions to pass therethrough but sufficiently small openings that molecular gases cannot pass therethrough, electrode means positioned each side of said ion-permeable means so that electrical current may flow from one of said electrode means to the other of said electrode means through said ion-permeable means, current flow causing ionization of an ionizable material at one of said electrodes and discharge of said ions after passing through the said ion-permeable means at the other of said electrodes in proportion to the charge passed through the said integrating means, and measuring means coupled to said work compartments measuring the difference in the quantities of ionizable material contained in each of said work compartments after current has flowed through said integrating means, said difference in the quantities of ionizable material in said work compartments proportional to said charge passed through said integrating means.

2. An electrochemical integrator as claimed in claim 9, wherein said electrode means includes a plurality of pairs of electrode leads, one of said pair of electrode leads connected to one wire screen electrode, the other of said pair of electrode leads connected to the other screen electrode.

3. A method for measuring electrical charge passed through a device which comprises the steps of:
introducing an ionizable material into a work area divided into work compartments by an ion-permeable membrane, said ion-permeable means comprising a solid polymeric ion exchange material having sufficiently large openings to permit ions to pass therethrough but sufficiently small openings that molecular gases cannot pass therethrough,
passing current from one electrode means to another electrode means through said ion-permeable membrane, said current flow causing ionization of an ionizable material at one of said electrodes and discharge of said ions after passing through the said ion-permeable membrane at said other electrode means, and
measuring the difference in quantities of ionizable material contained in each of said work compartments after current has flowed, said difference in quantities of ionizable material in said work compartments proportional to said electrical charge passed through said device.

4. An electrochemical integrator as claimed in claim 2, wherein said pairs of electrodes include pairs of electrode leads equally spaced about said wire screen electrodes.

5. An electrochemical integrating means according to claim 1 wherein said ion exchange material is polytetrafluoroethylene.

6. A method according to claim 3 wherein said ion exchange material is polytetrafluoroethylene.

7. An electrochemical integrator as claimed in claim 1, wherein said ionizable material is selected from the group consisting of hydrogen and oxygen, and wherein said ion exchange means transfers cations if said ionizable material is converted to cations and anions if said ionizable material is converted to anions.

8. An electrochemical integrator as claimed in claim 1, wherein said display means coupled between said work compartments comprises a capillary tube having extremities thereof connected between said work compartments and a droplet carried in said capillary tube, the position of said droplet in said capillary tube displaying the difference between the amount of said ionizable material contained in said work compartments.

9. An electrochemical integrator as claimed in claim 1, wherein said electrode means includes a pair of wire screen electrodes coupled to opposite sides of said ion-permeable means.

10. The method of claim 3, wherein said device is an electrochemical integrating means.

11. The method of claim 3, wherein said ionizable material is selected from the group consisting of hydrogen and oxygen, and wherein said ion-permeable membrane transfers cations if said ionizable material is converted to cations and anions if said ionizable material is converted to anions.

References Cited
UNITED STATES PATENTS

| | | | |
|---|---|---|---|
| 2,890,414 | 6/1959 | Snavely | 324—94 |
| 3,143,691 | 8/1964 | Hurd | 317—231 |
| 3,045,665 | 7/1962 | Moyat | 204—129 |
| 3,144,089 | 8/1964 | Lane | 317—231 |
| 3,209,255 | 9/1965 | Estes et al. | 317—231 |
| 3,417,009 | 12/1968 | Holden | 204—299 |
| 3,427,978 | 2/1969 | Hanneman et al. | 317—231 |

JAMES D. KALLAM, Primary Examiner

U.S. Cl. X.R.

29—570, 324—94

UNITED STATES PATENT OFFICE
CERTIFICATE OF CORRECTION

Patent No. 3,706,013    Dated 12-12-72

Inventor(s) Pierre L. Bourgault, George H. Fraser

It is certified that error appears in the above-identified patent and that said Letters Patent are hereby corrected as shown below:

Col. 5, line 48, change "4c" to ---4e---.

Signed and sealed this 15th day of May 1973.

(SEAL)
Attest:

EDWARD M. FLETCHER, JR.
Attesting Officer

ROBERT GOTTSCHALK
Commissioner of Patents